United States Patent
Choi

(10) Patent No.: US 9,493,078 B2
(45) Date of Patent: Nov. 15, 2016

(54) CHARGER FOR ELECTRIC VEHICLE

(71) Applicant: LSIS CO., LTD., Anyang-si, Gyeonggi-do (KR)

(72) Inventor: Seung Woo Choi, Suwon-si (KR)

(73) Assignee: LSIS CO., LTD, Anyang-si, Gyeonggi-do (KR)

( * ) Notice: Subject to any disclaimer, the term of this patent is extended or adjusted under 35 U.S.C. 154(b) by 601 days.

(21) Appl. No.: 13/917,909

(22) Filed: Jun. 14, 2013

(65) Prior Publication Data

US 2013/0335022 A1    Dec. 19, 2013

(30) Foreign Application Priority Data

Jun. 14, 2012 (KR) .................. 10-2012-0063738

(51) Int. Cl.
*B60L 11/18* (2006.01)

(52) U.S. Cl.
CPC ........ *B60L 11/1809* (2013.01); *B60L 11/1816* (2013.01); *B60L 11/1824* (2013.01); *B60L 2230/12* (2013.01); *B60L 2230/16* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
CPC .. B60L 11/1809; G02B 5/208; G02B 6/0005
USPC .................. 320/109; 362/551, 555
See application file for complete search history.

(56) References Cited

U.S. PATENT DOCUMENTS

| | | | | |
|---|---|---|---|---|
| 5,563,491 | A | * | 10/1996 | Tseng .................. B60L 11/1816 194/904 |
| 5,570,220 | A | * | 10/1996 | Matsumoto ............. H04N 7/22 348/343 |
| 2002/0154864 | A1 | * | 10/2002 | Yasuda ................ G02B 6/4246 385/49 |
| 2003/0120442 | A1 | * | 6/2003 | Pellegrino ........... B60L 11/1816 702/60 |
| 2007/0091634 | A1 | * | 4/2007 | Sakurada ............. B60Q 1/0011 362/555 |

(Continued)

FOREIGN PATENT DOCUMENTS

| | | |
|---|---|---|
| CN | 1163500 | 10/1997 |
| CN | 1250990 | 4/2000 |

(Continued)

OTHER PUBLICATIONS

Japan Patent Office Application Serial No. 2013-125329, Notice of Allowance dated Oct. 6, 2014, 3 pages.

(Continued)

*Primary Examiner* — Drew A Dunn
*Assistant Examiner* — Jerry D Robbins
(74) *Attorney, Agent, or Firm* — Lee, Hong, Degerman, Kang & Waimey

(57) ABSTRACT

A charger for an electric vehicle is provided. The charger supplies a current from a commercial power source to a battery of the electric vehicle. The charger includes a light emitting unit for displaying charging operation information of the charger, a communication unit for performing optical communication with an external device, and a control unit controlling the light emitting unit and the communication unit.

7 Claims, 3 Drawing Sheets

(56) References Cited

U.S. PATENT DOCUMENTS

| | | | | |
|---|---|---|---|---|
| 2007/0108284 | A1* | 5/2007 | Pankow | G06K 7/10851 |
| | | | | 235/454 |
| 2009/0297099 | A1* | 12/2009 | Benjamin | G02B 6/25 |
| | | | | 385/32 |
| 2010/0174667 | A1* | 7/2010 | Vitale | B60L 3/0069 |
| | | | | 705/412 |
| 2010/0225475 | A1* | 9/2010 | Karch | B60L 11/1824 |
| | | | | 340/540 |
| 2011/0175569 | A1* | 7/2011 | Austin | B60L 11/1824 |
| | | | | 320/109 |
| 2011/0204849 | A1* | 8/2011 | Mukai | B60L 3/0069 |
| | | | | 320/111 |
| 2013/0134933 | A1* | 5/2013 | Drew | H02H 5/04 |
| | | | | 320/109 |
| 2013/0155723 | A1* | 6/2013 | Coleman | G02B 6/0018 |
| | | | | 362/621 |

FOREIGN PATENT DOCUMENTS

| | | |
|---|---|---|
| JP | 06-200520 | 7/1994 |
| JP | 2000-115079 | 4/2000 |
| JP | 2007-047493 | 2/2007 |
| JP | 2008-072859 | 3/2008 |
| JP | 2009-124817 | 6/2009 |
| JP | 2010-273228 | 12/2010 |
| JP | 2012-044743 | 3/2012 |
| JP | 2013-125329 | 6/2013 |
| KR | 19980006603 | 3/1998 |
| KR | 1020010109964 | 12/2001 |

OTHER PUBLICATIONS

Japan Patent Office Application Serial No. 2013-125329, Office Action dated Apr. 8, 2014, 3 pages.
Korean Intellectual Property Office Application Serial No. 10-2012-0063738, Office Action dated Oct. 14, 2013, 5 pages.
The State Intellectual Property Office of the People's Republic of China Application Serial No. 201310316111.9, Office Action dated Dec. 23, 2014, 6 pages.
European Patent Office Application Serial No. 13171448.7, Search Report dated Oct. 20, 2015, 4 pages.

* cited by examiner

CHARGER FOR ELECTRIC VEHICLE

CROSS-REFERENCE TO RELATED APPLICATIONS

Pursuant to 35 U.S.C. §119(a), this application claims the benefit of earlier filing date and right of priority to Korean Patent Application No. 10-2012-0063738, filed on Jun. 14, 2012, the contents of which are hereby incorporated by reference herein in its entirety.

BACKGROUND

The present invention relates to a charger for an electric vehicle.

Electric vehicles mean vehicles driven by using electricity and may be classified into battery powered electric vehicles and hybrid electric vehicles.

In this case, battery powered electric vehicles are driven by only using electricity, which are generally designated as electric automobiles. Also, hybrid electric vehicles mean vehicles driven by using electricity and fossil fuel. Also, electric vehicles as described above each includes a battery for supplying electricity for driving. Particularly, in the case of battery powered electric vehicles and plug-in type hybrid electric vehicles, batteries thereof are charged by currents supplied from external power source and drive electric motors.

On the other hand, in the case of cord-set type chargers for charging electric vehicles, electric vehicles are charged by using commercial power source. For this, cord-set type chargers are connected to electric outlets provided in residences or offices and electric vehicles, thereby supplying power to electric vehicles.

General chargers include displays only for displaying charging states. Accordingly, when chargers are not working, it is impossible to analyze failure causes or to update firmware.

Such limitations may be overcome by forming ports for connecting diagnosis devices or firmware updating devices on chargers. However, in the case of chargers, which are necessary for providing waterproofing performance as mandatory, when ports are formed on chargers, additional configurations for providing waterproofing performances are needed. Also, since ports for communication are separately formed, malicious users may change or damage programs in chargers.

SUMMARY

Embodiments provide a charger for an electric vehicle.

In one embodiment, a charger to supply a current from a commercial power source to a battery of the electric vehicle includes a light emitting unit to display charging operation information of the charger, a communication unit to perform optical communication with an external device, and a control unit to control the light emitting unit and the communication unit.

In another embodiment, a charger for an electric vehicle includes a casing, a printed circuit board (PCB) provided in the casing, a plurality of LEDs installed on the PCB, a communication unit installed on the PCB to perform optical communication with an external device, a plurality of guides guiding lights of the plurality of LEDs, respectively, and a control unit to control operations of the plurality of LEDs and the communication unit. Some of the plurality of guides guide light emitted from one of the plurality of LEDs and light emitted from the communication unit.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Figure 1:
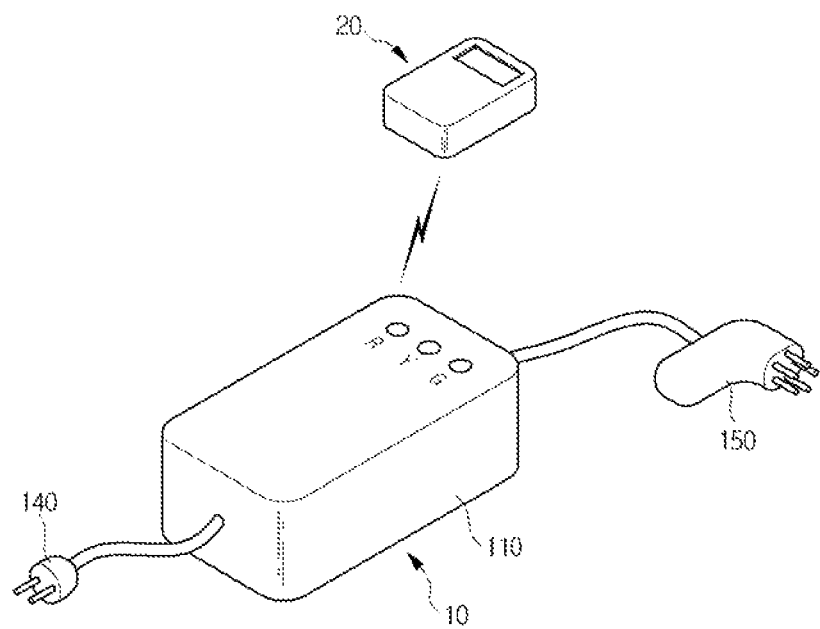
FIG. 1 is a perspective view illustrating a charger for an electric vehicle according to an embodiment of the present invention.
Figure 2:
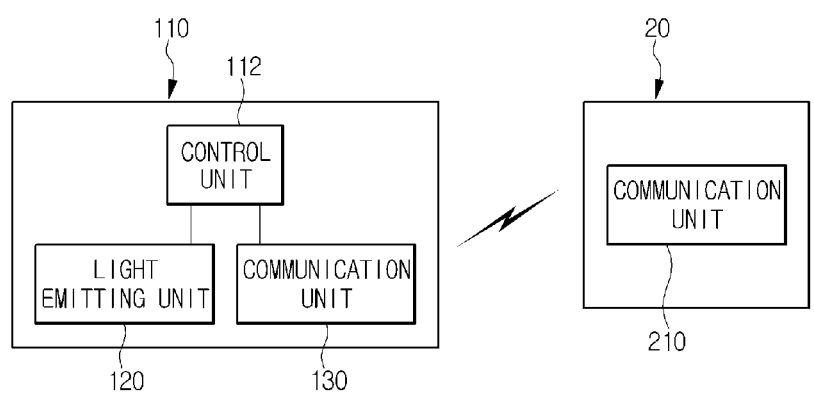
FIG. 2 is a block view illustrating the charger.

FIG. 1 is a perspective view illustrating a charger 10 for an electric vehicle, and FIG. 2 is a block view illustrating the charger 10.

Referring to FIGS. 1 and 2, the charger 10 is a cord-set type charger.

The charger 10 may include a body 110, a first connector 140 connected to the body 110 and connected to a commercial power source, and a second connector 150 connected to the body 110 and connected to the electric vehicle.

When the first connector 140 is connected to the commercial power source and the second connector 150 is connected to the electric vehicle, a current supplied from the commercial power source to a battery of the electric vehicle through the charger 10.

The body 110 may include a light emitting unit 120, a communication unit 130, and a control unit 112 controlling operations of the light emitting unit 120 and the communication unit 130.

The light emitting unit 120 may display information on operations of the charger 100, that is, charging operations. For example, the light emitting unit 120 may include a plurality of light emitting diodes (LEDs) emitting lights of different colors according to the charging operations.

The communication unit 130 may communicate with communication unit 210 of an external device 20 such as an analysis device for analyzing the charger 100 or an updating device for updating firmware of the charger 100.

The communication units 130 and 210 may communicate light as an example. That is, the communication units 130 and 210 may perform infrared communication.

Figure 3:
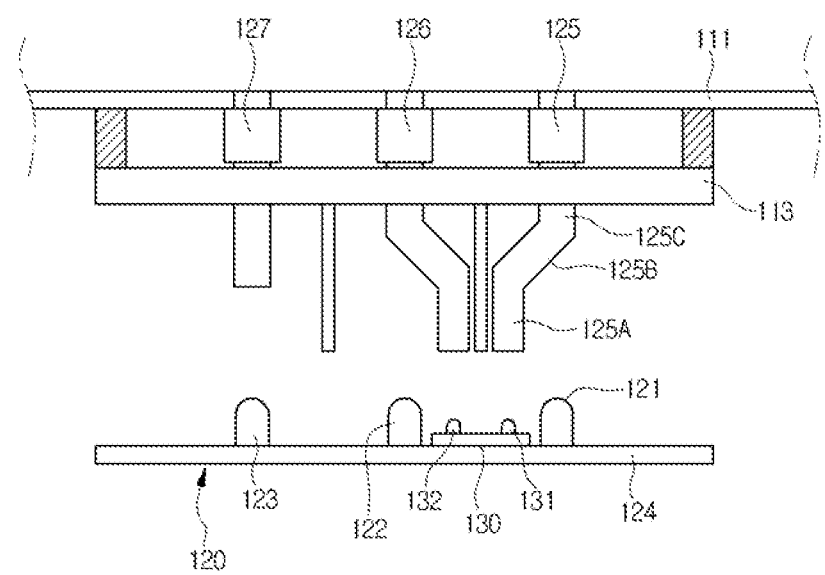
FIG. 3 is a schematic view illustrating an inner configuration of a body of the charger.

FIG. 3 is a schematic view illustrating an inner configuration of the body 110 of the charger 10.

Referring to FIGS. 2 and 3, the body 110 includes a casing 111 forming an exterior. The casing 110 may contain the light emitting unit 120 and the communication unit 130 therein.

The light emitting unit 120 may include a first LED 121, a second LED, 122, and a third LED 123. In the present embodiment, there is no limitation in the number of LEDs forming the light emitting unit 120, and as an example, the light emitting unit 120 may include three LEDs.

The respective LEDs 121, 122, and 123 are installed on a printed circuit board (PCB) 124.

For example, the first LED 121 may be turned on during a charging operation. For example, the first LED 121 may emit light of green color.

For example, the second LED 122 may be turned on when the charging operation is completed. For example, the second LED 122 may emit light of yellow color.

For example, the third LED 123 may be turned on when the charging operation is suspended. For example, the third LED 123 may emit light of red color.

In the present embodiment, colors of emitted lights of the respective LEDs and information displayed when the respective LEDs are turned on may be changed.

In this case, 'the completion of the charging operation' means that charging the battery of the electric vehicle is completed or supplying of the current from the commercial power source to the electric vehicle is perfectly finished as a case in which the first and second connectors 140 and 150 are separated.

Also, 'the suspension of the charging operation' means that supplying the current from the commercial power source to the electric vehicle is cut off. Substantially, 'the completion of the charging operation' means other cases that supplying the current from the commercial power source to the electric vehicle is cut off, excluding 'suspension of the charging operation'.

The body 110 may include guides 125, 126, and 127 guiding movement of lights of the respective LEDs 121, 122, and 123.

The guides 125, 126, and 127 includes a first guide 125 capable of guiding light of the first LED 121, a second guide 126 capable of guiding light of the second LED 122, and a third guide 127 capable of guiding light of the third LED 123. The respective guides 125, 126, and 127 may be arranged to be separated from the respective LEDs 121, 122, and 123 in a vertical direction and may be fastened to the casing 111 by a supporter 113.

The communication unit 130 may be installed on the PCB 124. The communication unit 130 may include a transmitter 131 and a receiver 132.

The communication unit 130 may be located between adjacent two of the plurality of LEDs 121, 122, ad 123. As an example, in FIG. 3, the communication unit 130 is located between the first LED 121 and the second LED 122. That is, the communication unit 130, the first LED 121, and the second LED 122 are separated from one another in a horizontal direction to prevent interference of lights.

The first guide 125 and the second guide 126 may guide infrared rays for communication. In the present embodiment, two or more guides are necessary for guiding infrared rays corresponding to the transmitter 131 and the receiver 132, respectively. Accordingly, the charger 10 may include a plurality of guides, some or the entire of which may guide not only lights of LEDs but also infrared rays for communication.

In detail, the first guide 125 and the second guide 126 each may include a first guiding part 125A extended in a vertical direction, an extended part 125B extended upwardly from the first guiding part 125A to be inclined, and a second guiding part 125C extended in a vertical direction from the extended part 125B.

In this case, as an example, the two extended parts 125B are extended from the first guides 125A to be apart from each other, respectively. Accordingly, a distance between the first guides 125A is shorter than a distance between the second guides 125C.

The first guiding part 125A of the first guide 125 guides an infrared ray generated by the transmitter 131, and the first guiding part 125A of the second guide 126 guides an infrared ray received from the external device 20 to the receiver 132.

Some or the entire of the first guides 125A and the second guides 125C do not overlap one another in a vertical direction due to the extended parts 125B. In the present embodiment, the vertical direction is the same as a direction of emitting light by an LED. Accordingly, according to a location of the LED, the direction of emitting light may be a lateral direction.

On the other hand, the third guide 127 is formed as a straight line extended in a vertical direction. Accordingly, the third guide 127 guides only light of the third LED 123.

The operations of the charger 10 will be described.

When the first connector 140 of the charger 10 is connected to the commercial power source, the second connector 150 is connected to the electric vehicle, and then the charging operation starts, the control unit 112 turns on the first LED 121. Then, green light emitted from the first LED 121 is emitted outside the charger 10 through the second guiding part 125C of the first guide 125. The emission of the green light may allow the user to know that the charging operation is being performed.

When the charging is completed while performing the charging operation, the control unit 112 turns on the second LED 122. Then, yellow light emitted from the second LED 122 is emitted outside the charger 10 through the second guiding part 125C of the second guide 126. The emission of the yellow light may allow the user to know that the charging operation is completed.

While performing the charging operation, when supplying power from the commercial power source to the electric vehicle is cut off, the control unit 112 turns on the third LED 123. Then, red light emitted from the third LED 123 is emitted outside the charger 10 through the third guide 127. The emission of the red light may allow the user to know that the supplying power is cut off.

On the other hand, while checking the state of the charger 10 or updating the firmware of the charger 10, the external device 20 is disposed adjacently to the charger 10 to perform communication with the charger 10.

In this case, a start signal of the communication may be transmitted from the external device 20 to the charger 10. That is, an infrared ray for starting the communication may be emitted from the external device 20.

The infrared ray emitted from the external device 20 passes through the second guiding part 125C, the extended part 125B, and the first guiding part 125A of the second guide 126 and arrives at the receiver 132.

Also, the transmitter 131 may transmit an infrared ray including information of a present state of the charger 10. The infrared ray transmitted from the transmitter 131 passes through the first guiding part 125A, the extended part 125B, and the second guiding part 125C of the first guide 125 and arrives at the external device 20.

According to the present embodiment, the charger 10 may transmit present state information to the external device 20 by using the transmitter 131 to allow the external device 20 to analyze the charger 10.

Also, the charger 10 may receive information for updating firmware from the external device 20 by using the receiver 132 to update the firmware of the charger 10.

Also, since an additional port is not exposed outside the body 110 and it is possible to communicate with the external device 20 through infrared communication, it is unnecessary to including an additional configuration to waterproof the body 110 and also a malicious access for communication is prevented because the port is not exposed outside.

Also, since a guide for guiding light of a light emitting unit may guide an infrared ray, an additional guide for guiding the infrared ray is not necessary.

As an example, in the present embodiment, a first guide guides light, that is, an infrared ray emitted by an LED and a second guide guides light, that is, an infrared ray received from the outside. Differently, one of the first guide and the second guide may guide the light emitted from the light emitting unit and the light received from the outside at the same time.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charger for supplying a current from a commercial power source to a battery of an electric vehicle, the charger comprising:
   a light emitting unit to display charging operation information of the charger;
   a communication unit to perform optical communication with an external device; and
   a control unit to control operations of the light emitting unit and the communication unit,
   wherein the communication unit comprises a transmitter to transmit light and a receiver to receive light emitted from the external device,
   wherein the light emitting unit comprises:
      a first light emitting diode and a second light emitting diode;
      a first guide to guide the light emitted from the first light emitting diode and the light emitted from the transmitter; and
      a second guide to guide the light emitted from the second light emitting diode and the light emitted from the external device toward the receiver,
   wherein the first guide and the second guide each comprises:
      a first guiding part;
      an extended part inclined and extending from the first guiding part; and
      a second guiding part extending from the extended part such that it is parallel to the first guiding part,
   wherein the transmitter and the receiver are disposed between the first light emitting diode and the second light emitting diode, and
   wherein a distance between the first guiding parts of the first guide and the second guide is shorter than a distance between the second guiding parts of the first guide and the second guide.

2. The charger of claim 1, wherein the communication unit is disposed between two adjacent LEDs.

3. The charger of claim 2, wherein the communication unit, the first light emitting diode, and the second light emitting diode are installed on a printed circuit board (PCB) to be separated from one another in a lateral direction.

4. The charger of claim 1,
   wherein corresponding axes of first and second guiding parts of each of the first guide and the second guide do not overlap in a light emitting direction of the first light emitting diode.

5. The charger of claim 4, wherein:
   light emitted by the first light emitting diode is directly emitted to the second guiding part of each of the first guide and the second guide; and
   light emitted from the transmitter sequentially passes through the first guiding part, the extended part, and the second guiding part of each of the first guide and the second guide.

6. The charger of claim 1,
   wherein corresponding axes of the first and second guiding parts of each of the first guide and the second guide do not overlap in a light emitting direction of the second light emitting diode.

7. The charger of claim 6, wherein light emitted from the external device passes through the second guiding part, the extended part, and the first guiding part of each of the first guide and the second guide and is received at the receiver.

* * * * *